(12) United States Patent
Sung

(10) Patent No.: US 10,462,271 B2
(45) Date of Patent: Oct. 29, 2019

(54) FASTENING DEVICE AND METHOD OF USING THE SAME

(71) Applicants: INVENTEC (PUDONG) TECHNOLOGY CORPORATION, Shanghai (CN); INVENTEC CORPORATION, Taipei (TW)

(72) Inventor: Tzu Wen Sung, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 674 days.

(21) Appl. No.: 15/081,890

(22) Filed: Mar. 27, 2016

(65) Prior Publication Data

US 2017/0155745 A1 Jun. 1, 2017

(30) Foreign Application Priority Data

Nov. 27, 2015 (CN) .......................... 2015 1 0847341

(51) Int. Cl.
*F16B 1/00* (2006.01)
*H04M 1/02* (2006.01)
*H04B 1/3827* (2015.01)

(52) U.S. Cl.
CPC .......... *H04M 1/026* (2013.01); *H04B 1/3827* (2013.01)

(58) Field of Classification Search
CPC ..... H04M 1/026; H04M 1/3827; G06F 1/187; G06F 1/1656
See application file for complete search history.

(56) References Cited

U.S. PATENT DOCUMENTS

2015/0288098 A1* 10/2015 Kuo ................. H01R 13/62977
439/343

* cited by examiner

*Primary Examiner* — Jacob J Cigna
*Assistant Examiner* — Lee A Holly
(74) *Attorney, Agent, or Firm* — Mark M. Friedman

(57) ABSTRACT

A fastening device is used to snap and carry an electronic device which includes a plurality of positioning holes on its bottom side. The fastening device has a sliding unit and a carrier unit. The sliding unit is used to connect with and carry the electronic device and includes two guiding rails, a pushing portion, and a plurality of positioning pins. The carrier unit is connected with the sliding unit and comprises a plate, a plurality of first limiting units, a plurality of second limiting units, and a link-handle. Through the fastening device, the assembly process for the electronic device is simplified.

5 Claims, 4 Drawing Sheets

FASTENING DEVICE AND METHOD OF USING THE SAME

BACKGROUND OF THE INVENTION

Field of Invention

The present invention relates to a fastening device and a method of using the same, and in particular to a fastening device and a method of using the same for an electronic assembly field.

Description of Prior Art

In the conventional art, in order to make two elements fix tightly without relative movement, generally, a lot of screws are used. Although screws are able to make two elements fix tightly, tools and/or human/machines are needed to turn the screws; it inevitably takes a certain amount of time.

For example, in the hard disk assembly technology, generally, screws are used for fixing inside an electronic device, however, besides using tools, there are other elements for fixation; it is necessary to estimate quantity of all elements that will be used at the early stage of manufacturing managing process. There are issues in the assembly process, such as bad assembly leads to a higher defective rate, or screws separate because of the falling of the hard disk.

In order to effectively decrease the assembly time during fixation among elements, decrease the cost of a number of parts, and lower the assembly defective rate, hence, it is necessary to provide a fastening device and a method of using the same, to solve the above technical issue.

SUMMARY OF THE INVENTION

An objective of the present invention is to provide a fastening device and a method of using the same.

To achieve the above objective, the present invention provides a fastening device, which is used to fasten an electronic device; the electronic device has a plurality of positioning holes on its bottom side, and the fastening device comprises a sliding unit and a carrier unit.

The sliding unit is used to snap and carry the electronic device; the sliding unit comprises two guiding rails, a pushing portion, and a plurality of positioning pins. Two ends of the pushing portion respectively connect with ends of the two guiding rails, to form a U shape structure. The positioning pins dispose on the two guiding rails. Positions and quantities of the positioning pins correspond with positions and quantities of the plurality of positioning holes. The positioning holes of the electronic device and the positioning pins of the sliding unit snap with each other, to achieve X axis and Y axis fixation between the sliding unit and the electronic device.

The carrier unit connects with the sliding unit. The carrier unit comprises a plate unit, a plurality of first limiting units, a plurality of second limiting units, and a link-handle. The plate unit has two side plates on its two sides and connects with a surface of the plate unit, to form another U shape for accepting the electronic device. The first limiting units are disposed on the plate unit; one end of each of the first limiting units closely abuts one of the two side plates, to form a plurality of inserting spaces with the plate unit. The inserting spaces each are used for inserting a part of the two guiding rails; the first limiting units are used for preventing the sliding unit from moving along a Z axis and an X axis.

The second limiting units are disposed on one end of the two side plates, extend toward the Z axis, and have a bending angle extending slantwise upwardly towards the first limiting units along a Y axis, to limit movement of the electronic device along the Z axis. The link-handle is disposed on one end of the plate unit far away from the second limiting units. The link-handle pushes the pushing portion while rotating, to make the sliding unit move along the Y axis.

In one preferred embodiment, the link-handle comprises a third limiting unit, a protrusion, and a through hole, the third limiting unit is used to limit movement of the electronic device along the Z axis, and the protrusion is used to push the push portion, to make the sliding unit move along the Y axis.

In one preferred embodiment, the fastening device further comprises a pivot axle, which is used to penetrate the through hole of the link-handle; one end of the pivot axle connects with the plate of the carrier unit; an opposite end of the pivot axle forms a flat head; an area of the flat head is larger than an area of the pivot axle, to prevent the link-handle from leaving the pivot axle and make the link-handle rotatively connect with the carrier unit.

In one preferred embodiment, the pushing portion is disposed on one side far away from the second limiting units and has a cavity. The link-handle pushes a side of the pushing portion defining the cavity, to make the sliding unit move along the Y axis.

In one preferred embodiment, the cavity is disposed on one end of the pushing portion near one of the two guiding rails.

To achieve the above objective, the present invention provides a fastening method for a fastening device, which is used to fasten an electronic device. The electronic device has a plurality of positioning holes on its bottom side, the fastening method comprising:

First, a sliding unit connects with a carrier unit; then, a pivot axle is used to penetrate a link-handle and connect with the carrier unit, to make the link-handle rotatively connect with the carrier unit; then, the positioning holes of the electronic device and positioning pins of the sliding unit snap with each other to achieve fixation of an X axis and a Y axis between the electronic device and the sliding unit; then, the link-handle is rotated to push the sliding unit to move along the Y axis to a fixation status. The carrier unit comprises a plurality of first limiting units and a plurality of second limiting units, while at the fixation status, the first limiting units are used for preventing the sliding unit from moving along the Z axis and the X axis, the second limiting units are used to limit movement of the electronic device along the Z axis, the link-handle is used to limit movement of the electronic device along the Y axis and the Z axis.

In one preferred embodiment, the sliding unit comprises two guiding rails and a pushing portion. Two ends of the pushing portion respectively connect with ends of the two guiding rails, to form a U shape structure. A plurality of positioning pins is disposed on the two guiding rails; positions and quantities of the positioning pins correspond with positions and quantities of the plurality of positioning holes; the positioning holes of the electronic device and the positioning pins of the sliding unit snap with each other. The link-handle comprises a third limiting unit, a protrusion, and a through hole; the third limiting unit is used to limit movement of the electronic device along the Z axis, and the protrusion is used to push the push portion to make the sliding unit move along the Y axis.

In one preferred embodiment, the fastening device further comprises a pivot axle, which is used to penetrate the through hole of the link-handle; one end of the pivot axle connects with the plate of the carrier unit; an opposite end of the pivot axle forms a flat head; an area of the flat head is larger than an area of the pivot axle, to prevent the link-handle from leaving the pivot axle and make the link-handle rotatively connect with the carrier unit.

In one preferred embodiment, the pushing portion is disposed on one side far away from the second limiting units and has a cavity. The link-handle pushes a side of the pushing portion defining the cavity to make the sliding unit move along the Y axis.

In one preferred embodiment, the cavity is disposed on one end of the pushing portion near one of the two guiding rails.

The conventional art needs to use screws and tools to fix two elements, however, the present invention uses a simple plug design with a link-handle to make two elements fix tightly, avoids movement in any direction, and hence reduces assembly time and the use of tools.

DETAILED DESCRIPTION OF THE PREFERRED EMBODIMENTS

Figure 1:
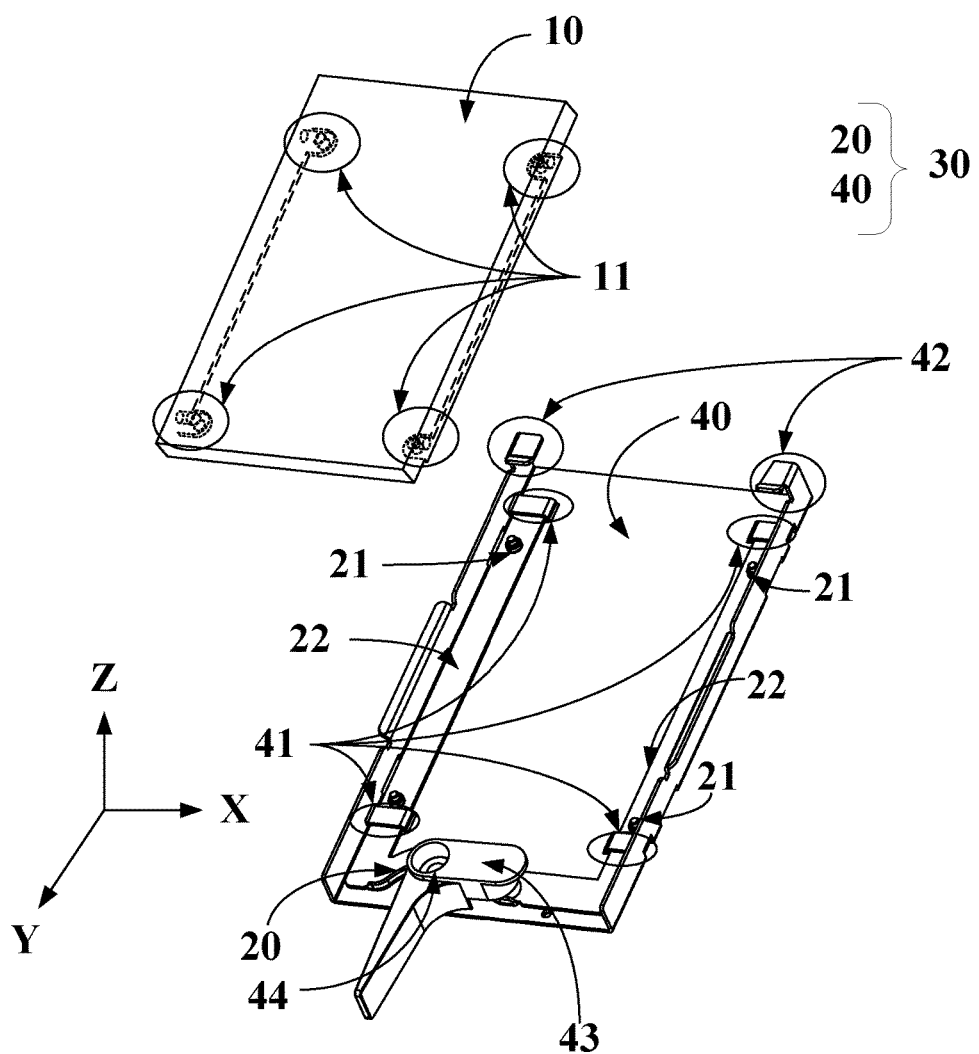
FIG. 1 is an exploded illustrative drawing of an electronic device and a fastening device according to the present invention.
Figure 2:
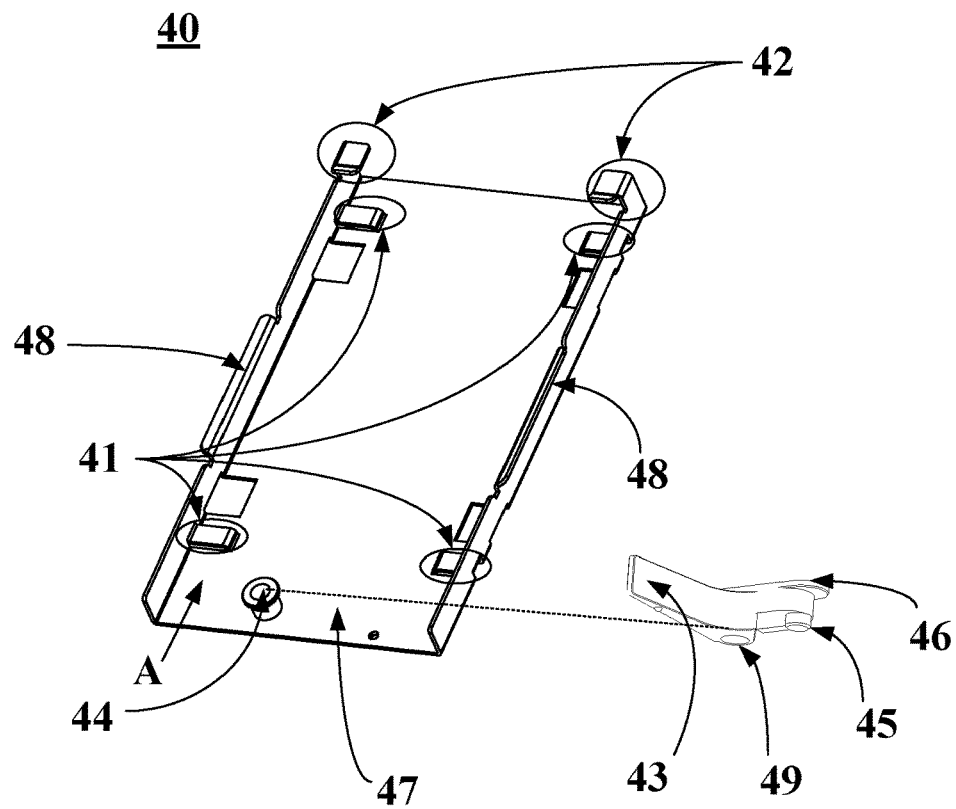
FIG. 2 is a detailed drawing of a carrier unit of the fastening device of FIG. 1.
Figure 3:
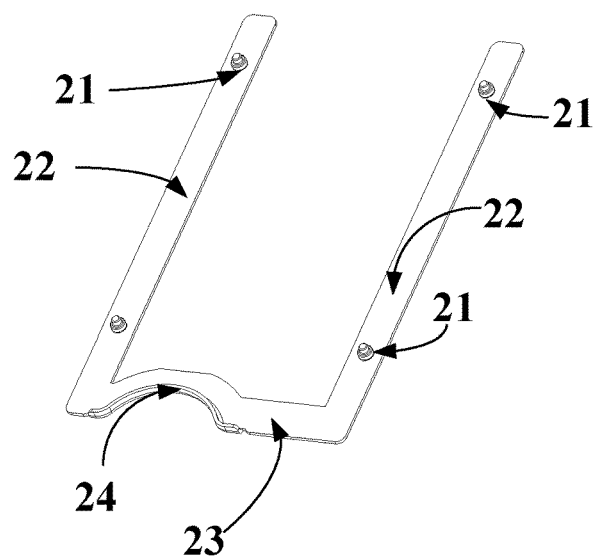
FIG. 3 is a detailed drawing of a sliding unit of the fastening device of FIG. 1.
Figure 4:
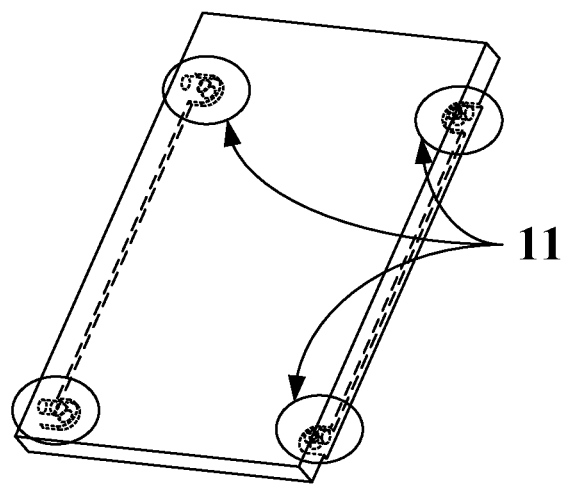
FIG. 4 is a detailed drawing of the electronic device of FIG. 1.
Figure 5:
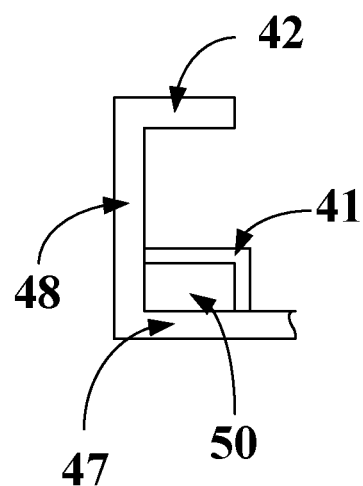
FIG. 5 is a side view from an arrow A of FIG. 2.

FIG. 1 is an exploded illustrative drawing of an electronic device 10 and a fastening device 30 according to the present invention. FIG. 2 is a detailed drawing of a carrier unit 40 of the fastening device 30 of FIG. 1. FIG. 3 is a detailed drawing of a sliding unit 20 of the fastening device 30 of FIG. 1. FIG. 4 is a detailed drawing of the electronic device 10 of FIG. 1. FIG. 5 is a side view from an arrow A of FIG. 2. The fastening device 30 is used to fasten the electronic device 10; the electronic device 10 has a plurality of positioning holes 11 on its bottom side. The fastening device 30 comprises the sliding unit 20 and the carrier unit 40.

Please refer to FIGS. 1-5, the present invention is concerned with the fastening device 30, which is used to fasten the electronic device 10. The electronic device 10 can be a hard disk or internet card with signal pins. The electronic device 10 has a plurality of positioning holes 11 on its bottom side. The fastening device 30 comprises the sliding unit 20 and the carrier unit 40. The sliding unit 20 comprises two guiding rails 22, a pushing portion 23, and a plurality of positioning pins 21. Two ends of the pushing portion 23 respectively connect with one end of the two guiding rails 22, to form a U shape structure. The positioning pins 21 are disposed on the two guiding rails 22; positions and quantities of the positioning pins 21 correspond with positions and quantities of the plurality of positioning holes 11; the positioning holes 11 of the electronic device 10 and the positioning pins 21 of the sliding unit 20 snap with each other, to achieve X axis and Y axis fixation between the sliding unit 20 and the electronic device 10. The carrier unit 40 connects with the sliding unit 20. The carrier unit 40 comprises a plate unit 47, a plurality of first limiting units 41, a plurality of second limiting units 42, and a link-handle 43. The plate unit 47 has two side plates 48 on its two sides. The two side plates 48 connect with a surface of the plate unit 47, to form another U shape for accepting the electronic device 10. The first limiting units 41 are disposed on the plate unit 47. One end of each of the first limiting units 41 is closely abutted on one of the two side plates 48, whereby the first limiting units 41 form a plurality of inserting spaces 50 with the plate unit 47. The inserting spaces 50 each are used for inserting a part of the two guiding rails 22. The first limiting units 41 are used for preventing the sliding unit 20 from moving along a Z axis and the X axis. The second limiting units 42 are disposed on ends of the two side plates 48, extend toward the Z axis, and have a bending angle extending slantwise upwardly toward the first limiting units 41 along the Y axis, to limit movement of the electronic device 10 along the Z axis. The link-handle 43 includes a third limiting unit 46, a protrusion 45 and a through hole 49. The third limiting unit 46 is used for limiting the movement of the electronic device 10 along the Z axis. The protrusion 45 is used to push the pushing portion 23, to make the sliding unit 20 move along the Y axis. The fastening device 30 further comprises a pivot axle 44, which is used to penetrate the through hole 49 of the link-handle 43. One end of the pivot axle 44 connects with the plate 47 of the carrier unit 40. An opposite end of the pivot axle 44 forms a flat head; an area of the flat head is larger than an area of the pivot axle 44, to prevent the link-handle 43 from leaving the pivot axle 44 and make the link-handle 43 rotatively connect with the carrier unit 40. The pushing portion 23 is disposed on one side of the plate unit 47 far away from the second limiting units 42 and has a cavity 24. The link-handle 43 pushes a side of the pushing portion 23 defining the cavity 24, to make the sliding unit 20 move along the Y axis. The cavity 24 is disposed on one end of the pushing portion 23 near one of the two guiding rails 22.

In detail, the positioning holes 11 are formed on two opposite lateral sides of the bottom side of the electronic device 10. The sliding unit 20 can be a U shape plate; the guiding rails 22 are two parallel sides of the U shape plate. The positioning pins 21 are short studs formed on a top surface of the guiding rails 22.

Preferably, in the present invention, four positioning holes 11 correspond with four positioning pins 21.

Preferably, the present invention uses two guiding rails 22 respectively, with two of the first limiting units 41. Each guiding rail 22 corresponds with the two first limiting units 41, which are disposed on two opposite ends of each guiding rail 22 parallel the Y axis, to limit each guiding rail 22 to only move along the Y axis. Each guiding rail 22 has two positioning pins 21 within the corresponding two first limiting units 41. The link-handle 43 rotatively connects with the carrier unit 40 through the pivot axle 44. The link-handle 43 is only able to rotate within a certain rotation angle along XY plane, while the link-handle 43 rotates, it can drive the sliding unit 20 to move along the Y axis.

Preferably, the electronic device 10 can be a hard disk, after the sliding unit 20 is pushed along the Y axis, golden fingers of the electronic device 10 connect with golden finger slot (not shown) of the carrier unit 40. The second limiting units 42 are designed according to a size of the electronic device 10, to make the electronic device 10 not able to move along the Z axis, after the electronic device 10 is fixed, to avoid damage of the electronic device 10 (such as the golden fingers thereof bending and breaking).

Figure 6:
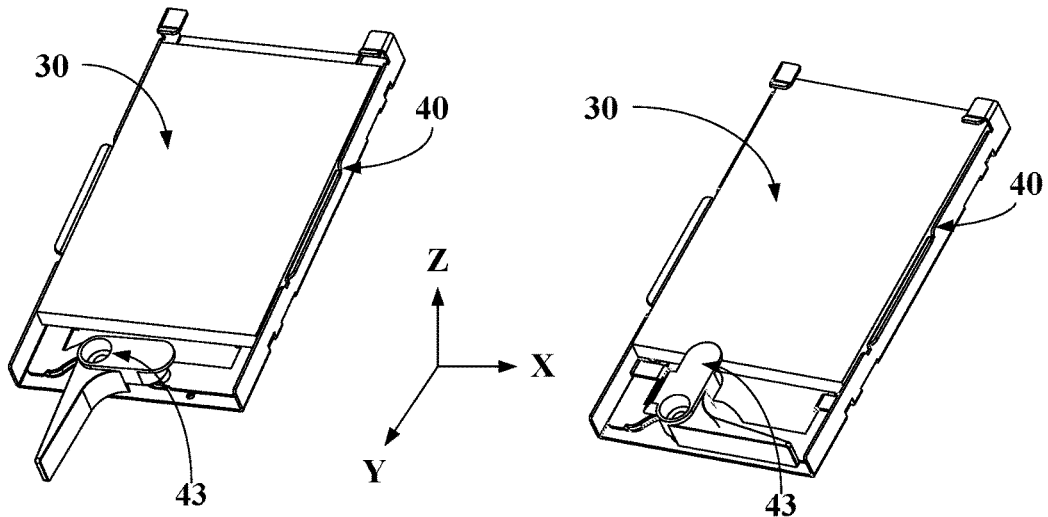
FIG. 6 shows two views respectively illustrating a before and after fixation situation of the fastening device according to the present invention.

Refer to FIG. 6, which shows two views respectively of before and after fixation conditions of the fastening device 30 according to the present invention. The left one shows that the link-handle 43 does not push the side of the pushing portion 23 of the sliding unit 20 defining the cavity 24; in other words, the sliding unit 20 is at a free movement status along the Y axis; the right one shows that the link-handle 43 has pushed the side of the pushing portion 23 of the sliding unit 20 defining the cavity 24; in other words, the sliding unit 20 is at a non-free movement status along the Y axis. In detail, while a user rotates the link-handle 43 counterclockwise, the protrusion 45 of the link-handle 43 will touch the side of the pushing portion 23 defining the cavity 24. The cavity 24 has a specific shape to make the protrusion 45 engage with the side of the pushing portion 23 defining the cavity 24, while the link-handle 43 rotates counterclockwise, thereby to make the sliding unit 20 move to a fixation status. In the fixation status (right one), the first limiting units 41 are used for preventing the sliding unit 20 from moving along the Z axis and the X axis, and the link-handle 43 pushes the side of the pushing portion 23 defining the cavity 24, to make the sliding unit 20 fixed along the Y axis. The second limiting units 42 are used to limit movement of the electronic device 10 along the Z axis. The link-handle 43 has specific fixing structure such as latch or groove and etc., to make itself unable to rotate freely, then, to ensure that the electronic device 10 and the carrier unit 40 have firmly combined in three dimensions.

Figure 7:
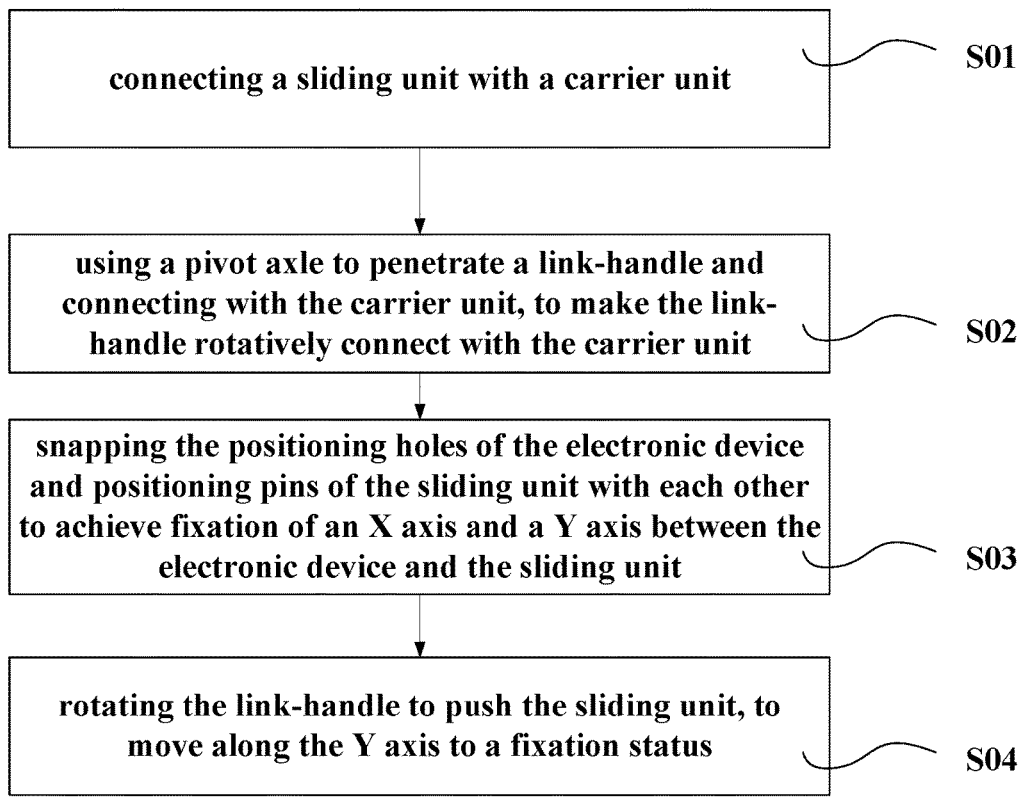
FIG. 7 is a flow diagram of a fastening method for the fastening device according to the present invention.

Refer to FIG. 7, which is a flow diagram of a fastening method for the fastening device according to the present invention. Please refer to the above elements, no description is added. First, proceeding step S01, a sliding unit 20 connects with a carrier unit 40; then, proceeding step S02, a pivot axle 44 is used to penetrate a link-handle 43 and connect with the carrier unit 40, to make the link-handle 43 rotatively connect with the carrier unit 40; then, proceeding step S03, the positioning holes 11 of the electronic device 10 and the positioning pins 21 of the sliding unit 20 snap with each other to achieve fixation of an X axis and a Y axis between the electronic device 10 and the sliding unit 20; then, proceeding step S04, the link-handle 43 is rotated to push the sliding unit 20, to move along the Y axis to a fixation status.

The conventional art needs to use screws and tools to fix two elements, however, the present invention uses simple plug design with link-handle to make two elements fix tightly, avoid movements in any directions, and hence to reduce assembly time and the use of tools.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. A fastening device, which is used to fasten an electronic device, the electronic device has a plurality of positioning holes on its bottom side, the fastening device comprising:

a sliding unit, being used to snap and carry the electronic device, the sliding unit comprising: two guiding rails and a pushing portion, two ends of the pushing portion respectively connecting with ends of the two guiding rails, to form a U shape structure; and a plurality of positioning pins disposing on the two guiding rails, positions and quantities of the positioning pins corresponding with positions and quantities of the plurality of positioning holes, the positioning holes of the electronic device and the positioning pins of the sliding unit snapping with each other, to achieve X axis and Y axis fixation between the sliding unit and the electronic device; and a carrier unit for connecting with the sliding unit, the carrier unit comprising:

a plate unit having two vertical side plates on its two sides and connecting with a horizontal surface of the plate unit, to form another U shape for accepting the electronic device;

a plurality of first limiting units, being disposed on the plate unit, one end of each of the first limiting units connect to one of the two side plates, to form a plurality of inserting spaces with the plate unit, the inserting spaces being used for inserting a part of each of the two guiding rails, the first limiting units being for preventing the sliding unit from moving along a Z axis and the X axis;

a plurality of second limiting units, being disposed on ends of the two side plates, extending toward the Z axis, and having a bending angle extending slantwise upwardly towards the first limiting units along the Y axis, to limit movement of the electronic device along the Z axis; and a link-handle, being disposed on one end of the plate unit opposite to the second limiting units, the link-handle pushing the pushing portion while rotating, to make the sliding unit move along the Y axis.

2. The fastening device according to claim 1, wherein the link-handle comprises a protrusion and a through hole, the protrusion is used to push the pushing portion to make the sliding unit move along the Y axis.

3. The fastening device according to claim 1, wherein the fastening device further comprises a pivot axle, which is used to penetrate the through hole of the link-handle, one end of the pivot axle connects with the plate of the carrier unit, an opposite end of the pivot axle forms a flat head, an area of the flat head is larger than an area of the pivot axle, to prevent the link-handle from leaving the pivot axle and make the link-handle rotatively connect with the carrier unit.

4. The fastening device according to claim 1, wherein the pushing portion is disposed on one side opposite to the second limiting units and has a cavity, the link-handle pushes a side of the pushing portion defining the cavity to make the sliding unit move along the Y axis.

5. The fastening device according to claim 1, wherein the cavity is disposed on one end of the pushing portion connecting to one of the two guiding rails.

* * * * *